United States Patent [19]
Yun

[11] Patent Number: 6,084,959
[45] Date of Patent: Jul. 4, 2000

[54] METHOD AND APPARATUS FOR CONTROLLING THE RING VOLUME OF A TELEPHONE

[75] Inventor: Sung-Hum Yun, Gumi, Rep. of Korea

[73] Assignee: SamSung Electronics Co., Ltd., Kyungki-do, Rep. of Korea

[21] Appl. No.: 08/857,511

[22] Filed: May 16, 1997

[30] Foreign Application Priority Data

May 18, 1996 [KR] Rep. of Korea ................... 96-16833

[51] Int. Cl.$^7$ .................. H04M 1/00; G08B 1/00
[52] U.S. Cl. ................ 379/373; 379/372; 379/375; 340/328
[58] Field of Search .................. 379/373, 375, 379/418; 381/57

[56] References Cited

U.S. PATENT DOCUMENTS

| | | | |
|---|---|---|---|
| 4,076,968 | 2/1978 | Wattenbarger . | |
| 4,523,058 | 6/1985 | Stevens et al. | 379/375 |
| 5,715,308 | 2/1998 | Shankarappa | 379/373 |
| 5,877,676 | 3/1999 | Shankarappa | 340/309.15 |

FOREIGN PATENT DOCUMENTS

| | | |
|---|---|---|
| 3-201857 | 9/1991 | Japan . |
| 4-14347 | 1/1992 | Japan . |
| 5-30161 | 2/1993 | Japan . |
| 5-236071 | 9/1993 | Japan . |
| 8-88674 | 4/1996 | Japan . |
| 4-185037 | 7/1997 | Japan . |

*Primary Examiner*—Forester W. Isen
*Assistant Examiner*—Clark S. Cheney
*Attorney, Agent, or Firm*—Robert E. Bushnell, Esq.

[57] ABSTRACT

A method and apparatus for controlling ring volume if a telephone by memorizing the ring volume in state where a telephone call is answered responsive to ring tone of the telephone and then, generating the ring tone with the memorized ring volume when a next telephone call occurs. The ring volume of a telephone is controlled by a user setting an initial volume value in memory and a central processing unit determines whether a ring detector detects a first ring signal after setting the initial volume value, produces a current volume value for controlling a volume of a ringer according to the initial volume value upon detection of the first ring signal, produces a reduced volume value by reducing the current volume value by a predetermined step when the telephone is answered after the first ring signal, replaces the initial volume value stored in the memory with the reduced volume value, produces an increased volume value by increasing the current volume value by the predetermined step upon detection of a subsequent ring signal for step increasing the volume of the ringer and repeating the step of producing an increased volume value until the telephone is answered, and replaces the initial volume value stored in memory with the increased volume value when the telephone rings more than one time before being answered.

12 Claims, 2 Drawing Sheets

METHOD AND APPARATUS FOR CONTROLLING THE RING VOLUME OF A TELEPHONE

CLAIM OF PRIORITY

This application makes reference to, incorporates the same herein, and claims all benefits accruing under 35 U.S.C. §119 from applications for METHOD FOR CONTROLLING RING VOLUME OF TELEPHONE earlier filed in the Korean Industrial Property Office on May 18, 1996 and there duly assigned Serial No. 96/16833.

BACKGROUND OF THE INVENTION

1. Field of the Invention

The present invention relates to a method for controlling ring volume of a telephone and in particular, a method for controlling the ring volume of the telephone by memorizing the ring volume in a state where a telephone call is answered responsive to a ring tone of the telephone and then, generating the ring tone with the memorized ring volume when the next telephone call and responsive ring tone occurs.

2. Description of the Related Art

Generally, the telephone informs a user thereof of generation of a telephone call by generating a ring tone in response to the incoming telephone call. At this time, the user can control ring volume by utilizing a ring volume controlling unit installed in the telephone. As a result, if a low ring volume is set in the telephone, the user can not hear the ring tone of the telephone when the user is far away from the telephone or there is loud noise around him/her. To solve the problem of loud noise, a device for controlling ring volume is described in U.S. Pat. No. 4,076,968 to Blake Wattenbarger entitled *Telephone Ringer Intensity Control Responsive To Ambient Noise* wherein a ringer is responsive to a noise measuring circuit is control the loudness of the ringer. The control signal generated by the noise measuring circuit also includes a measurement of noise caused by ring bursts of a predetermined time interval.

Another exemplary device for controlling ring volume of a telephone includes: a tone ringer using a common tone ringer integrated circuit (IC) for generating the ring tone representative of reception of a telephone call in correspondence with an input of a ring signal from a telephone line; a ring detector connected to the telephone line for detecting the ring signal input from the telephone line and then, providing a ring detection signal to a central processing unit; a hook detector for detecting whether the telephone is under an on-hook state or an off-hook state through an operational state of a hook switch and then, providing the detected state of the telephone to the central processing unit; the central processing unit outputs a control signal to control terminals of a multiplexer to gradually increase the ring volume level according to the number of ring signals that are detected by the ring detector; The multiplexer selects the level of the ring tone output from the tone ringer in response to the control signal output by the central processing unit, thereby outputting a selected tone level to an amplifier; and the amplifier amplifies the level of the ring tone selected and outputted from the multiplexer, thereby transmitting the amplified the level thereof to a speaker. When a ring signal is applied via the telephone line, the tone ringer controls the ring volume and generates the ring tone, thereby outputting the generated ring tone. At this time, if the ring signal is detected from the ring detector, the central processing unit controls the multiplexer, thereby selecting the level of the ring tone generated from the tone ringer and then, the selected output level is provided to the speaker via the amplifier. The multiplexer selects the lowest ring tone of the kinds of the ring tone inputted through a plurality of resistors coupled to a single node an then, outputs the selected lowest ring tone thereof. After that, if the user does not answer the telephone call the central processing unit controls the multiplexer in order that the ring tone gradually rings loudly accordingly to the number of ring signals detected by the ring detector.

When an initial ring occurs, however, the exemplary device described above gradually increases the ring tone from the lowest ring tone. As a result, there is a problem with the device for controlling ring volume in that, when the initial ring occurs in condition that the user is far away from the telephone, the user can not hear the ring tone. Also, in spite of the generation of the ring tone, it may be easy to give others unpleasant feeling since the user can not hear the ring tone until the ring tone is gradually increased according to the number of rings, thereby answering the telephone call late.

SUMMARY OF THE INVENTION

It is therefore an object of the present invention to provide a method for controlling ring volume of a telephone by memorizing the ring volume in state where a telephone call is answered responsive to ring tone of the telephone and then, generating the ring tone with the memorized ring volume in case that next ring tone occurs.

To achieve the above object, there is provided with a method for controlling ring volume of a telephone, wherein: when a user answer s a telephone call up a ring tone rings one time, a ring volume controlling value which is more reduced than current ring tone by one step is memorized, and upon there is incoming ring, the ring volume controlling value is increased by one steps accordingly to the number of detection of ring signal, thereby memorized the ring volume controlling value just when answering the telephone call and the, generating the ring tone as the memorized ring volume controlling value upon there is next ring tone occurs.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENTS

In the following description, numeral specific details such components and frequencies of the concrete circuit, are set forth to provide a more thorough understanding of the present invention. It will be apparent, however, to one skilled in the art that the present invention may be practiced without these specific details. The detailed description on known function and constructions unnecessarily obscuring the subject matter of the present invention will be avoided in the present invention.

Figure 1:
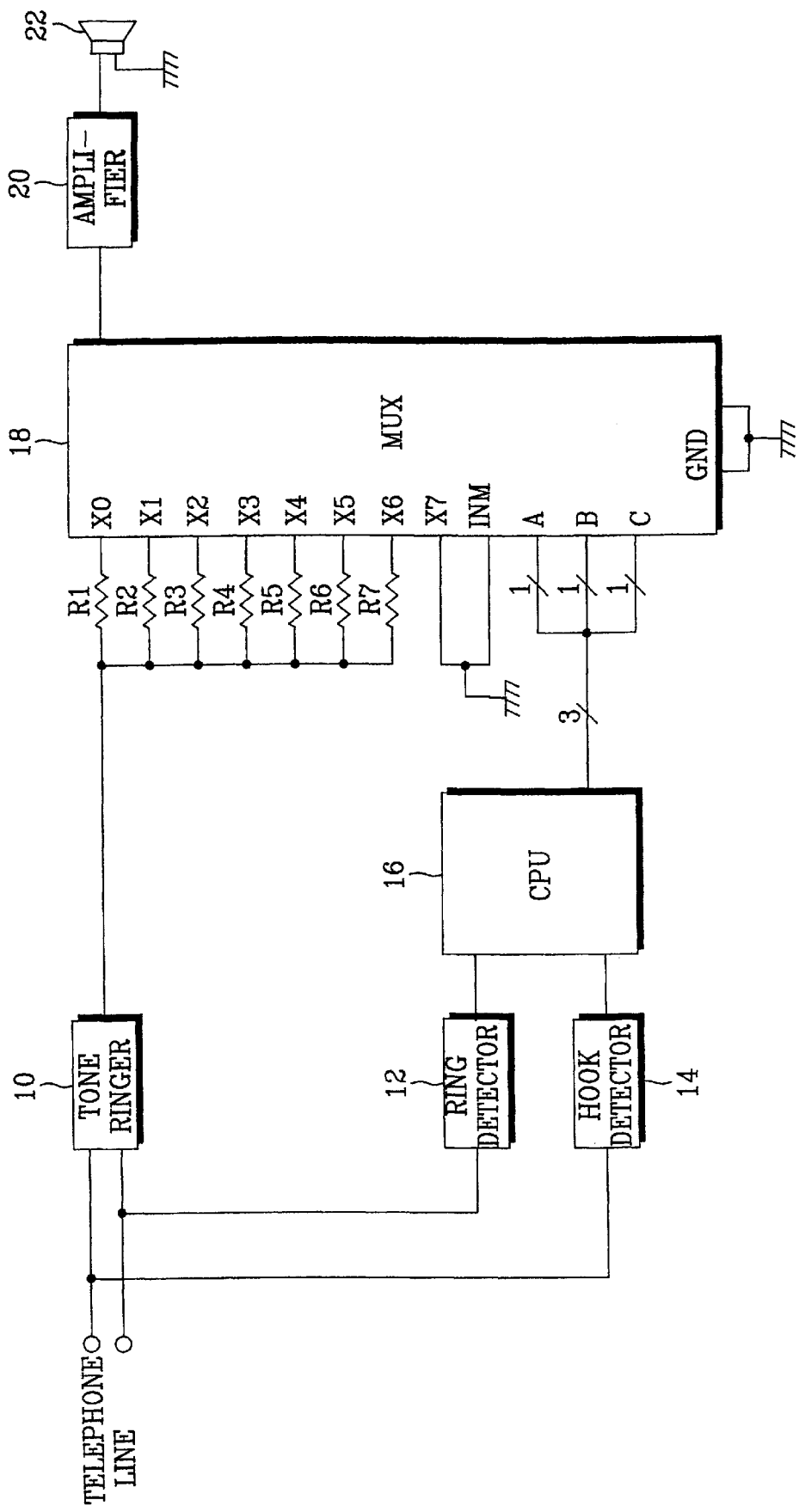
FIG. 1 is a block diagram illustrating a device for controlling ring volume of a telephone.

FIG. 1 is a block diagram illustrating a device for controlling ring volume of a telephone, which includes: a tone ringer 10 using a common tone ringer integrated circuit (IC) for generating the ring tone representative of reception of a telephone call in correspondence with an input of a ring signal from a telephone line; a ring detector 12 connected to the telephone line for detecting the ring signal input from the telephone line and then, providing a ring detection signal to a central processing unit (CPU) 16; a hook detector 14 for detecting whether the telephone is under an on-hook state or an off-hook state through an operational state of a hook switch and then, providing the detected state of the telephone to CPU 16; CPU 16 outputs a control signal to control terminals A, B, and C of a multiplexer (MUX) 18 to gradually increase the ring volume level according to the number of ring signals that are detected by ring detector 12; MUX 18 selects level of the ring tone output from tone ringer 10 in response to the control signal output by CPU 16, thereby outputting a selected tone level to an amplifier 20; and amplifier 20 amplifies the level of the ring tone selected and outputted from the MUX 18, thereby transmitting the amplified the level thereof to a speaker 22. When a ring signal is applied via the telephone line, tone ringer 10 controls the ring volume and generates the ring tone, thereby outputting the generated ring tone. At this time, if the ring signal is detected from the ring detector 12, CPU 16 controls MUX 18, thereby selecting the level of the ring tone generated from the tone ringer 10 and then, the selected output level is provided to speaker 22 via amplifier 20. MUX 18 selects the lowest ring tone of the kinds of the ring tone inputted through resistors R1 to R7 an then, outputs the selected lowest ring tone thereof. After that, if the user does not answer the telephone call the CPU 16 controls the MUX 18 in order that the ring tone gradually rings loudly accordingly to the number of ring signals detected by ring detector 12.

The device for automatically controlling ring volume according to an embodiment of the present invention is controlled by CPU 16 to generate a ring tone wherein a level of one of the generated rings in response to a telephone call is memorized when the telephone is answered, and upon detection of a ring signal for a next received telephone call, the ring volume will be increased in steps from the memorized level in response to each detected ring signal of the currently received telephone call.

Figure 2:
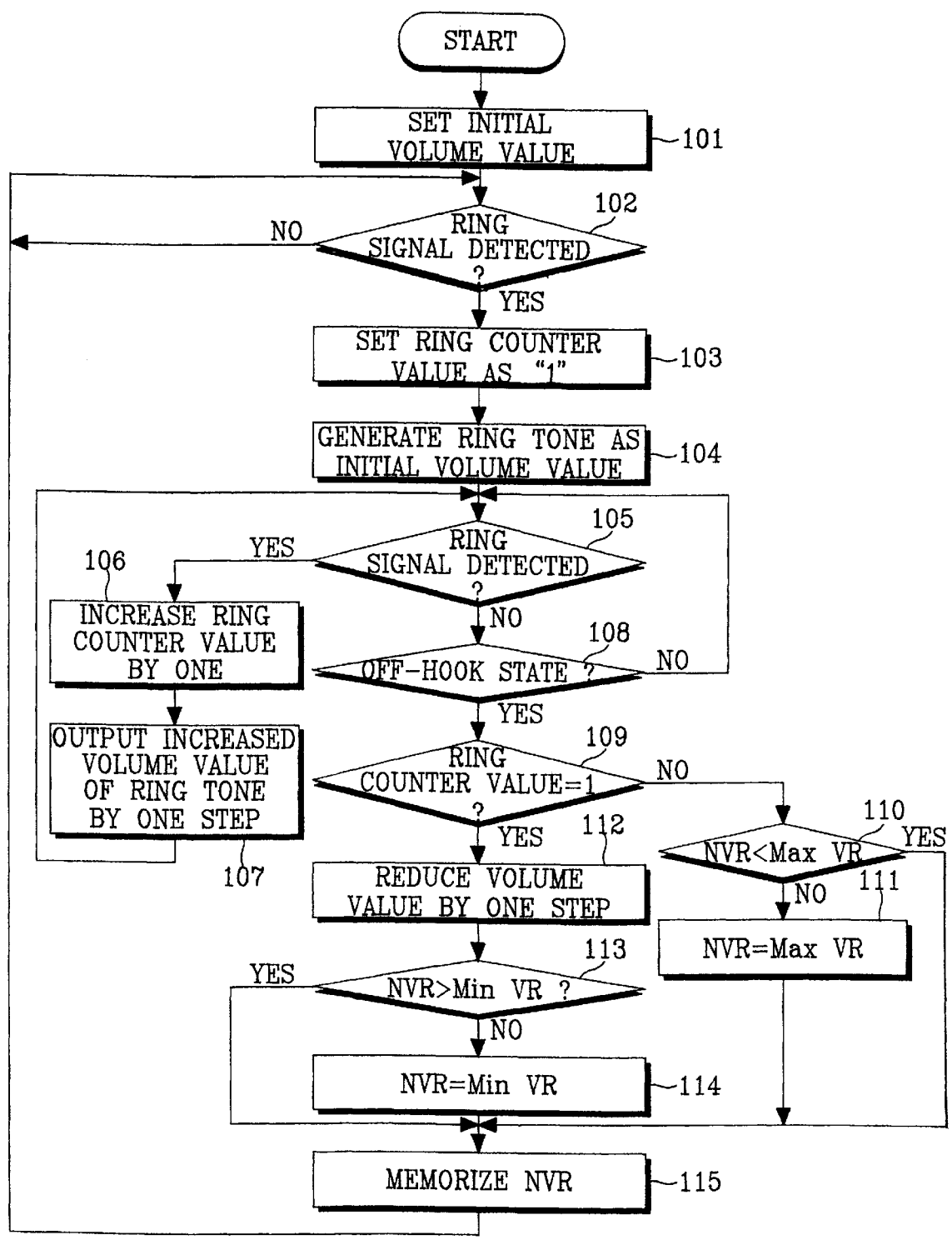
FIG. 2 is a control flow chart illustrating process for controlling ring volume according to a preferred embodiment of the present invention.

FIG. 2 is a control flow chart illustrating process for controlling the ring volume according to a preferred embodiment of the present invention. Now, the preferred embodiment of the present invention will be described in detail with reference to the accompanying drawings FIGS. 1 and 2.

A user, utilizing CPU 16, sets a desirable initial volume value NVR in step 101. CPU 16 then continuously checks, in step 102, whether or not a ring signal is detected from ring detector 12. Once CPU 16 has been determined that ring detector 12 has detected a ring signal in the step 102, a ring counter value as set to "1" in step 103, and CPU 16 controls MUX 18 to generate ring tone, in step 104, in response to the signal from tone ringer 10 having the initial volume value NVR set in step 101. Then, in step 105, CPU 16 checks whether or not another the ring signal is detected from the ring detector 12. Once CPU 16 has been determined that ring detector 12 has detected another ring signal in the step 105, CPU 16 increases the ring counter value by one, in step 106, and controls MUX 18 to increase the volume of the generated ring tone, in step 107, and then repeats step 105. When CPU 16 determines that ring detector 12 fails to detect another ring signal in step 105, CPU 16 checks hook detector 14 to determine whether or not the telephone is under an off-hook state. If an off-hook state is not detected in step 108, CPU 16 returns the step 105. Accordingly, steps 105 through 108 will be repeated until an off-hook state exists thereby causing the ring counter to be increased by one each time a ring signal is detected, and thus, increasing the volume value NVR and the volume of the generated ring tone up to a maximum level Max VR.

Once an off-hook state is determined in step 108, CPU 16 proceeds to step 109, thereby checking whether or not the ring counter value is equal to "1". When it is determined that the ring counter value is equal to "1", CPU 16 reduces the volume value NVR by one step in step 112 and then checks whether or not the reduced volume value NVR is higher than a minimum volume value Min VR. If checked in the step 113 that reduced volume value NVR was higher than a minimum volume value Min VR in step 113. When it is determined that reduced volume value NVR is higher than minimum volume value Min VR, CPU 16 proceeds to step 115, thereby memorizing reduced volume value NVR as the ring volume controlling value. When it is determined that reduced volume value NVR is not higher than minimum volume value Min VR, CPU 16 sets reduced volume value NVR equal to a value equal to minimum volume value Min VR proceeds to step 115 to memorize reduced volume value NVR as the ring volume controlling value. Then CPU 16 returns to step 102.

When it is determined in step 109 that the ring counter value is equal to "1", CPU 16 proceeds to step 110 and checks whether or not volume value NVR is lower than a maximum volume value Max VR. When it is determined that volume value NVR is less than maximum volume value Max VR, CPU 16 proceeds to step 115 described above. When it is determined that volume value NVR is not less than maximum volume value Max VR, CPU 16 proceeds to step 111 and sets volume value NVR to a value equal to maximum volume value Max VR proceeds to step 115 described above.

As is apparent from the foregoing, when the telephone is under the off-hook state due to a called party answering the telephone call after the telephone rang one time, the device for controlling the ring volume according to the present invention reduces the current volume value by one step and memorizes reduced volume value or a predetermined minimum volume value, which ever is greater. When the called party does not answer the telephone after the first ring then the volume value is increased by one step in response to each detected ring signal until the called party answers the telephone (or until the calling party hangs up). When the called party answers the telephone after more than one ring the current volume value or a maximum volume value is memorized, which ever is less. Then, upon receipt of a new ring signal corresponding to a new telephone call, the volume of the ringer is controlled according to the memorized volume value.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art which this invention pertains.

What is claimed is:

1. A method for controlling ring volume of a telephone, comprising the steps of:

producing a current volume value for controlling a volume of a ringer according to a memorized volume value upon detection of a first ring signal;

producing a reduced volume value by reducing said current volume value by a predetermined step when said telephone is answered after said first ring signal; and storing the greater of a minimum volume value and said reduced volume value as said memorized volume value.

2. The method as set forth in claim 1, further comprising the steps of:

producing an increased volume value by increasing said current volume value by said predetermined step upon detection of a subsequent ring signal for step increasing said volume of said ringer and repeating said step of producing an increased volume value until said telephone is answered; and storing the lesser of a maximum volume value and said increased volume value as said memorized volume value when said telephone rings more than one time before being answered.

3. A method for controlling ring volume of a telephone, comprising the steps of:

setting an initial volume value in memory;

determining whether a ring detector detects a first ring signal after setting said initial volume value;

producing a current volume value for controlling a volume of a ringer according to said initial volume value upon detection of said first ring signal;

producing a reduced volume value by reducing said current volume value by a predetermined step when said telephone is answered after said first ring signal;

replacing said initial volume value stored in said memory with said reduced volume value;

producing an increased volume value by increasing said current volume value by said predetermined step upon detection of a subsequent ring signal for step increasing said volume of said ringer and repeating said step of producing an increased volume value until said telephone is answered; and replacing said initial volume value stored in memory with said increased volume value when said telephone rings more than one time before being answered.

4. The method as set forth in claim 3, further comprising the steps of:

setting a ring counter value to one upon detection of said first ring signal;

increasing said ring counter by one upon detection of said subsequent ring signals;

detecting an off-hook state of said telephone;

determining whether said ring counter value is equal to one when said off-hook state is detected;

performing said step of producing said reduced volume value when it is determined that said ring counter value is equal to one; and performing said step of replacing said initial volume value stored in memory with said increased volume value when it is determined that said ring counter value is not equal to one.

5. The method as set forth in claim 3, wherein said step of replacing said initial volume value stored in said memory with said reduced volume value comprises:

determining whether said reduced volume value is greater than a predetermined minimum volume value;

setting said reduced volume value to a value equal to said minimum volume value when it is determined that said reduced volume value is not greater than said minimum volume value and storing said reduced volume value having a value equal to said minimum volume value in said memory; and storing said reduced volume value in said memory when it is determined that said reduced volume value is greater than a predetermined minimum volume value.

6. The method as set forth in claim 3, wherein said step of replacing said initial volume value stored in memory with said increased volume value comprises:

determining whether said increased volume value is less than a predetermined maximum volume value;

setting said increased volume value to a value equal to said maximum volume value when it is determined that said increased volume value is not less than said maximum volume value and storing said increased volume value having a value equal to said maximum volume value in said memory; and storing said increased volume value in said memory when it is determined that said increased volume value is less than a predetermined maximum volume value.

7. The method as set forth in claim 4, wherein said step of replacing said initial volume value stored in said memory with said reduced volume value comprises:

determining whether said reduced volume value is greater than a predetermined minimum volume value;

setting said reduced volume value to a value equal to said minimum volume value when it is determined that said reduced volume value is not greater than said minimum volume value and storing said reduced volume value having a value equal to said minimum volume value in said memory; and storing said reduced volume value in said memory when it is determined that said reduced volume value is greater than a predetermined minimum volume value.

8. The method as set forth in claim 4, wherein said step of replacing said initial volume value stored in memory with said increased volume value comprises:

determining whether said increased volume value is less than a predetermined maximum volume value;

setting said increased volume value to a value equal to said maximum volume value when it is determined that said increased volume value is not less than said maximum volume value and storing said increased volume value having a value equal to said maximum volume value in said memory; and storing said increased volume value in said memory when it is determined that said increased volume value is less than a predetermined maximum volume value.

9. An apparatus for controlling ring volume of a telephone, comprising:

a tone ringer connected to a telephone line for producing a ringer signal upon detection of a ring signal;

a multiplexer having a plurality of signal input terminals and a plural control terminals, wherein each of said signal input terminals is connected to receive said ringer signal through a respective one of corresponding plurality of resistors;

an amplifier for amplifying an output of said multiplexer;

a speaker for producing an audible ring in response to an output of said amplifier;

a ring detector connected to said telephone line for producing a ring detection signal by detecting said ring signal;

a hook detector for detecting whether said telephone is in one of an on-hook state and an off-hook state;

a central processing unit having a memory for storing a current volume value, said central processing means outputting said current volume value as a control signal to said plural control terminals of said multiplexer for controlling said ring volume when said ring detector detects a first ring signal;

said central processing unit producing a reduced volume value by reducing said current volume value by a predetermined step and storing said reduced volume value as said current volume value in said memory when said hook detector detects an off-hook state before said ring detector detects a second ring signal;

said central processing unit producing an increased volume value by increasing said current volume value by said predetermined step when said ring detector detects a second ring signal and increasing said increased volume value by said predetermined step upon each subsequent detected ring signal; and said central processing unit storing said increased volume value as said current volume value in said memory when said hook detector detects said off-hook state after one of said second or subsequent ring signals is detected by said ring detector.

10. The apparatus as set forth in claim 9, wherein said central processing unit determines whether said reduced volume value is greater than a predetermined minimum volume value, sets said reduced volume value to a value equal to said minimum volume value when it is determined that said reduced volume value is not greater than said minimum volume value and stores said reduced volume value having a value equal to said minimum volume value in said memory as said current volume value, and stores said reduced volume value as is in said memory as said current volume value when it is determined that said reduced volume value is greater than said minimum volume value.

11. The apparatus as set forth in claim 9, wherein said central processing unit determines whether said increased volume value is less than a predetermined maximum volume value, sets said increased volume value to a value equal to said maximum volume value when it is determined that said increased volume value is not less than said maximum volume value and stores said increased volume value having a value equal to said maximum volume value in said memory as said current volume value, and stores said increased volume value as is in said memory when it is determined that said increased volume value is less than a predetermined maximum volume value.

12. The apparatus as set forth in claim 9, wherein said central processing unit sets a ring counter value to one upon detection of said first ring signal, increases said ring counter value by one upon detection of said second and subsequent ring signals, determines whether said ring counter value is equal to one when said off-hook state is detected, reduces said current volume value when it is determined that said ring counter value is equal to one, and stores said increased volume value as said current volume value when it is determined that said ring counter value is not equal to one.

* * * * *